United States Patent [19]  [11] 3,860,487
Emanuel, deceased  [45] Jan. 14, 1975

[54] PROCESS FOR GROWING BACTERIA OR FODDER

[75] Inventor: Carl F. Emanuel, deceased, late of Bellevue, Wash. by Mary Victoria Emanuel, administratrix

[73] Assignee: The Boeing Company, Seattle, Wash.

[22] Filed: June 12, 1974

[21] Appl. No.: 478,463

Related U.S. Application Data

[60] Division of Ser. Nos. 313,788, Dec. 11, 1972, and Ser. No. 207,488, Dec. 13, 1971, abandoned, said Ser. No. 313,788, is a continuation-in-part of Ser. No. 207,488.

[52] U.S. Cl............. 195/96, 47/1.2, 195/100, 195/102, 260/209, 260/239 A, 260/397, 260/255, 260/534 R
[51] Int. Cl............................................ C12d 13/00
[58] Field of Search............. 47/1.2; 71/9, 15, 24; 195/99, 100, 101, 102, 103, 96; 260/255

[56] References Cited
UNITED STATES PATENTS
3,292,584  12/1966  Brodrick .......................... 47/1.2 X Primary Examiner—Alvin E. Tanenholtz
Assistant Examiner—Robert J. Warden
Attorney, Agent, or Firm—Robert W. Beach

[57] ABSTRACT

Poultry feces are processed through a digester and a separator to produce undissolved solid material and a liquid filtrate. The solid material contains primarily food undigested by the poultry which is blended with comminuted egg shells, comminuted feathers, nutrients to provide a balanced food and new food to produce feed for fowl or stock. The filtrate is chemically treated for recovery of uric acid precipitate, and the remaining filtrate is used as a bacterial culture to produce bacterial protein. Used liquid from the bacterial culture is used as hydroponic culture to grow green fodder.

7 Claims, 1 Drawing Figure

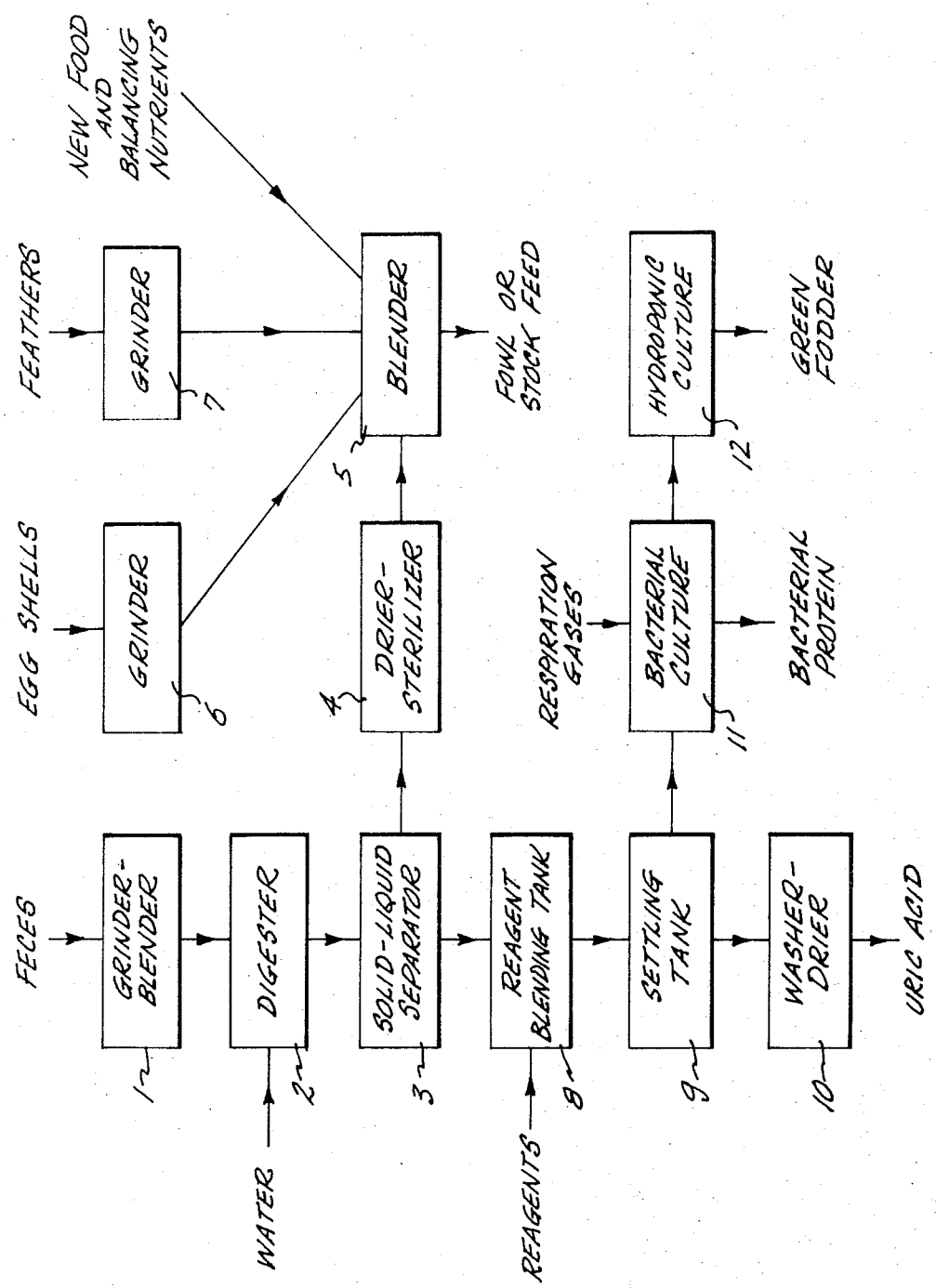

PROCESS FOR GROWING BACTERIA OR FODDER

This application is a division of application Ser. No. 207,488 now abandoned, filed Dec. 13, 1971, for Conservation and Conversion of Poultry Waste Products, and of application Ser. No. 313,788, filed Dec. 11, 1972, for Conservation and Conversion of Poultry Waste Products, said latter application being a continuation-in-part of said application Ser. No. 207,488 now abandoned.

The present invention relates to a process for conserving solid material of poultry waste products for its food value, for recovering chemical by-products and for converting residual material into cultures utilized in the production of bacterial protein and/or for hydroponics culture.

An important object of the present invention is to minimize the problem of disposing of poultry waste products by conserving and converting them into useful products.

The drawing is a flow diagram representing sequential steps in the conservation and conversion process of the present invention.

The process of the present invention is particularly well suited to the conservation and conversion of waste products from chickens, but is also applicable to the utilization of waste products from poultry of other types. A principal function of the process is to recover undigested food from poultry feces for reuse as food. It has been found that as much as 80 per cent of the dry weight of poultry feces is composed of undigested food.

Poultry digests and utilizes approximately 80 per cent of the dry weight of food eaten. Feces excreted are approximately 75 per cent water, and of the 25 per cent dry material of the feces 80 per cent is undigested food, amounting to approximately 15 per cent to 16 per cent of the original food. To recover, and thus conserve, such undigested food from poultry feces, the feces are first comminuted in a grinder-blender 1.

After being reduced to a substantially homogeneous condition, the comminuted material is transferred to a digester 2 in which water and base, such as alkali, are added to the comminuted material. The proportion of water to comminuted material should be from one to three times as great a volume of water as of comminuted material, but preferably the ratio should be approximately equal volumes of water and comminuted material. The base can be of the organic or inorganic type, depending upon which type may be preferable for ultimate use of the liquid phase of the material. Potassium hydroxide and/or sodium hydroxide alkalis are suitable. The concentration of alkali may be within the range of 1 to 4 per cent of the weight of water, approximately 2 per cent being preferable. The principal purpose of the base solution added in the digester is to neutralize the acidity of the feces, to assist in solution of soluble ingredients of the feces and to disinfect the feces. The operation of the digester is conducted without the addition of heat other than that supplied by the base, the temperature being in the range of 60° to 90°F.

The contents of the digester should be stirred continuously during the digesting process so as to bring all of the solid material into intimate contact with the treating liquid. Also, to facilitate such contact the feces should be ground so that at least most of the particles are less than one millimeter in maximum dimension. The digestion process should be accomplished in approximately 15 minutes. The degree of digestion of the material will depend upon its composition, but the digestion should be sufficient so that the solid material recovered for food purposes does not have a disagreeable odor or appearance. From the digester, the digested material is transferred to a separator 3, by which the solid phase and the liquid phase are separated by settling, centrifuging, filtration, dialyzing or some combination of such operations so as to preserve in such liquid phase substantially all of the soluble ingredients dissolved in the treating liquid.

The liquid phase of the separation includes soluble protein, inorganic salts, uric acid, bacterial products, and mucin. The separated solid material to be recycled as food enters the drier 4 in which excess moisture is removed.

The final food product is produced by combining in a blender 5 the dried undigested food recovered in the drier 4 from the poultry feces, egg shells comminuted in a grinder 6, feathers comminuted in a grinder 7 and new, uneaten food and such nutrients as may be required to produce a nutritionally balanced feed.

The liquid phase of the separation in the separator 3 may remove various types of chemicals that can be used as a source of chemical by-products, and can also provide nutrient liquid for bacterial cultures and/or hydroponic cultures. The remaining liquid phase is transferred from the separator 30 to the reagent blending tank 8 to which suitable reagents are supplied for the purpose of producing uric acid. Such uric acid production may, for example, be of the type disclosed in U.S. Pat. No. 2,302,204 of Gable.

Following the blending of the liquid phase from the separator 3 and the reagents in the reagent blending tank 8, the mixture is transferred to the settling tank 9 in which the uric acid is precipitated and settles. Such settled material is transferred to the washer-drier 10 from which the uric acid is removed in powder form.

The uric acid by-product of the feces may be from 2 per cent to 10 per cent of the fecal dry weight source material. The uric acid can be processed subsequently to produce a variety of drugs, chemicals, plastics and adhesives including cyanuric acid, from which melamine can be produced for use in making melamine resin plastic. In addition, the uric acid can be used in the production of barbituric acid, dialuric acid, violuric acid, alloxantin, alloxan, parabanic acid, biuret, purpuric acid, hydurilic acid, allantoic acid, allantoin and urea.

In addition, other chemical products can be recovered from the liquid phase of the digested feces resulting from the separation in the separator 3, such as plant hormones, steroids, ureido compounds, amino acids, carbohydrates and biliverdin. Some of the amino acids may be suitable for adding to the blender 5 for balancing the nutrient value of the fowl or stock feed produced in the blender.

Liquid drawn from the settling tank 9 can be used as a source of carbon, nitrogen, sulphur, nutrient chemicals and minerals and/or used in bacterial cultures and/or hydroponic cultures. Bacterial protein may be produced by such bacterial cultures and green fodder can be produced by hydroponic cultures which can be used as additional food or food ingredients for fowl or stock feed. A representative utilization of such liquid is indicated in the drawing.

Liquid can be transferred from the settling tank 9 to a bacterial culture 11, and such liquid can be supplemented by spent respiration gases which are principally carbon dioxide and nitrogen. Modern poultry houses have completely controlled air-conditioning systems in which the air is recirculated. During such recirculation the temperature and humidity of the air is adjusted. Such air can be bubbled through the bacterial culture and the hydroponic culture to dissolve from it carbon dioxide and other soluble gases for utilization by the bacteria and plants supported by such cultures. Such a bacterial culture can produce about 1 gram of bacterial protein for 8 liters of liquid. The bacterial culture may, for example, be similar to those disclosed in U.S. Pat. No. 2,742,359 of Rahn, U.S. Pat. No. 3,421,942 of McBaine, or U.S. Pat. No. 3,462,275 of Bellamy.

The resulting bacterial protein can be dried, preferably sterilized, and added to the blender 5 as a part of the new food and balancing nutrient content of the poultry or stock feed. Drying can be effected by heating or centrifuging, or both. The mixture of amino acids in the bacterial protein could be fractionated to recover specific acids if desired. Alternatively the entire mixture could be freeze-dried. After drying the entire mixture could be pelletized to provide a high grade protein for poultry or stock feed.

Alternatively, or after being used as the liquid for the bacterial culture, the liquid can be used for a hydroponic culture 12 in which to grow green fodder such as duckweed and/or barley. Such hydroponics may be generally of the type disclosed in U.S. Pat. No. 2,952,096 of Hughes or U.S. Pat. No. 3,292,584 of Brodrick. The culture liquid will supply the plant life with potash, phosphorous, ammonia, sulphur and minerals obtained from the poultry feces. For proper plant growth the inorganic salt content of the culture should not appreciably exceed 3 per cent by weight of the culture. The liquid discarded from the hydroponic culture is sufficiently degraded so that it will not cause appreciable pollution if discharged without treatment into natural bodies of fresh water.

The composition of poultry feces resulting from feeding the poultry with a predetermined food composition is substantially constant. Consequently the solid phase of the material recovered from the separator 3 is substantially uniform, and if it is mixed with predetermined proportions of comminuted egg shells, comminuted feathers, new food, and perhaps bacterial protein, the composition of the food fed to the poultry will be substantially unvarying.

It will therefore not be necessary to monitor the operation of the process closely or to provide constant supervision or frequent adjustment of the operation of the process.

I claim:

1. The method of treating poultry feces which comprises digesting a mixture of water and comminuted poultry feces for dissolving soluble components from the feces, separating the solid phase from the liquid phase of the mixture existing immediately at the completion of the digesting step and thereby obtaining a body of liquid segregated from the solid phase which body of liquid contains substantially all of the soluble ingredients, removing at least one selected dissolved ingredient from such segregated body of liquid phase after its separation from the solid phase to provide a remaining body of liquid of the liquid phase, and then growing either bacterial culture or green fodder in said remaining body of liquid of the liquid phase.

2. The method defined in claim 1, wherein bacterial culture is grown in the remaining body of liquid thereby producing bacterial protein.

3. The method defined in claim 1, wherein green fodder is grown in the remaining body of liquid.

4. The method defined in claim 1, wherein the digesting mixture includes a base solution and comminuted poultry feces for dissolving soluble components from the feces, and further treating the separated body of liquid with reagents for recovering therefrom uric acid.

5. The method of treating poultry feces which comprises digesting a mixture of a base solution and comminuted poultry feces for dissolving soluble components from the feces, separating the solid phase and the liquid phase of the digested mixture, and treating such liquid phase with reagents for recovering therefrom precipitated uric acid, the liquid remaining after precipitation of the uric acid being adapted for use as a culture medium.

6. The method defined in claim 5, including the further step of growing bacterial culture in the liquid remaining after precipitation of the uric acid and thereby producing bacterial protein.

7. The method defined in claim 5, including the further step of hydroponically growing green fodder in the liquid remaining after precipitation of the uric acid.

* * * * *